(12) United States Patent
Takeyama et al.

(10) Patent No.: US 11,967,926 B2
(45) Date of Patent: Apr. 23, 2024

(54) SOLAR POWER GENERATION SYSTEM

(71) Applicant: OMRON Corporation, Kyoto (JP)

(72) Inventors: Takahiro Takeyama, Kyoto (JP); Ryo Ogura, Kyoto (JP); Jeongho Baik, Kyoto (JP); Jun Nakaichi, Kyoto (JP); Tsuyoshi Uchida, Hoffman Estates, IL (US); Tomoko Endo, Hoffman Estates, IL (US); Erica Martin, Hoffman Estates, IL (US)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/107,014

(22) Filed: Feb. 8, 2023

(65) Prior Publication Data
US 2023/0268879 A1  Aug. 24, 2023

(30) Foreign Application Priority Data

Feb. 22, 2022  (JP) ................................ 2022-026165

(51) Int. Cl.
*H02S 40/36* (2014.01)
*H02S 40/32* (2014.01)
*H02S 50/00* (2014.01)

(52) U.S. Cl.
CPC .............. *H02S 40/36* (2014.12); *H02S 40/32* (2014.12); *H02S 50/00* (2013.01)

(58) Field of Classification Search
CPC .......... H02S 40/36; H02S 40/32; H02S 50/00; H02H 7/20; H02J 1/10; H02J 13/00036; H02J 3/001; H02J 3/381; H02J 2300/24; Y02E 10/50
See application file for complete search history.

(56) References Cited

U.S. PATENT DOCUMENTS

| 2016/0049537 | A1* | 2/2016 | Ueda | H01L 31/0504 |
| | | | | 136/244 |
| 2017/0271875 | A1* | 9/2017 | Narla | H02S 40/38 |
| 2019/0027617 | A1* | 1/2019 | Varlan | H02S 50/10 |
| 2021/0281065 | A1* | 9/2021 | Zhu | H02S 40/32 |

FOREIGN PATENT DOCUMENTS

| JP | 2012-511299 A | 5/2012 |
| WO | 2010/065043 A1 | 6/2010 |

* cited by examiner

*Primary Examiner* — Michael Y Sun
(74) *Attorney, Agent, or Firm* — SHINJYU GLOBAL IP

(57) ABSTRACT

A solar power generation system includes a string, an inverter a first shut-off device, and a second shut-off device. The string includes a plurality of solar cell module groups connected in series with each other. The first shut-off device cuts off a connection between the plurality of solar cell module groups connected to a first electric path connecting between the plurality of solar cell module groups in response to a first control signal from the inverter. The second shut-off device is connected to the first shut-off device in a two-way communicable manner by a communication system different from power line communication and cuts off a connection between the solar cell module groups connected to a second electric path connecting between the plurality of solar cell module groups in response to a second control signal output from the first shut-off device by a communication system different from power line communication.

17 Claims, 9 Drawing Sheets

| OPERATION MODE | WEATHER/ SUNSHINE | POWER GENERATION | CONTROL SIGNAL | RELAY OPERATION MODE |
|---|---|---|---|---|
| START | ☀ | YES | ON | ON |
| ACTIVE | ☀ | YES | ON | ON |
| SAFETY NORMAL SHUT-OFF | ☾🌧 | NO | ON | OFF |
| | ⛅ | UNSTABLE | ON | ON/OFF |
| EMERGENCY SAFETY SHUT-OFF | ☀ | YES | OFF | OFF |

FIG. 5

SOLAR POWER GENERATION SYSTEM

CROSS-REFERENCE TO RELATED APPLICATION

This application claims priority to Japanese Patent Application No. 2022-026165, filed Feb. 22, 2022. The contents of that application are incorporated by reference herein in their entirety.

FIELD

The present invention relates to a solar power generation system.

BACKGROUND

In the United States, for the purpose of protecting firefighters from electric shock in an emergency such as a fire, the introduction, into a solar power generation system, of a so-called rapid shutdown function for immediately stopping the power generation by a solar power generation system in an emergency is mandated by National Electrical Code (NEC). For example, Published Japanese Translation No. 2012-511299 of the PCT International Publication discloses a solar power generation system in which the output of power from solar cell modules to an inverter is stopped according to the operating state of the inverter.

SUMMARY

In a solar power generation system, in order to further improve the safety of firefighters in the event of a fire, for example, preferably a shut-off device having the rapid shutdown function is installed for each solar cell module. However, the shut-off device for each solar cell module increases the installation cost of the shut-off devices.

An object of the present invention is to provide a solar power generation system that achieves both the decrease in installation cost of shut-off devices and the improvement of stability of the solar power generation system.

A solar power generation system according to one aspect of the present invention includes a string, an inverter, a first shut-off device, and a second shut-off device. The string includes a plurality of solar cell module groups connected in series with each other. The plurality of solar cell module groups each include one or a plurality of solar cell modules connected in series. The inverter is connected to the string for converting DC power output from the solar cell modules to AC power. The first shut-off device is connected to a first electric path connecting between the plurality of solar cell module groups. The second shut-off device is connected to a second electric path connecting between a plurality of solar cell module groups different from the plurality of solar cell module groups connected to the first electric path. The plurality of solar cell module groups in the string each have an open circuit voltage equal to or less than a predetermined open circuit voltage. The first shut-off device cuts off the connection between the plurality of solar cell module groups connected to the first electric path, in response to a first control signal from the inverter. The second shut-off device is connected to the first shut-off device in a two-way communicable manner by a communication system different from power line communication and cuts off a connection between the solar cell module groups connected to the second electric path in response to a second control signal output from the first shut-off device.

In this solar power generation system, the first shut-off device and the second shut-off device are in a master-slave relationship, and the second shut-off device cuts off the connection between the plurality of solar cell module groups in response to the second control signal output from the first shut-off device. As such, the configuration of the second shut-off device can be simplified, reducing the installation cost of the second shut-off device. In addition, since each of the plurality of solar cell module groups has an open-circuit voltage equal to or less than a predetermined open-circuit voltage, a highly safe solar power generation system can be provided. The second control signal from the first shut-off device is output by a communication system different from power line communication, and thereby the signal is unlikely to be affected by noise as compared with the power line communication, and the communication from the first shut-off device to the second shut-off device can be stabilized. Further, since the second shut-off device is connected to the first shut-off device in a two-way communicable manner, for example, a state of the second shut-off device can be monitored by the first shut-off device.

The first shut-off device may be configured to monitor the second shut-off device based on a second state signal output from the second shut-off device. In this case, the first shut-off device can monitor whether the second shut-off device is operating normally.

When the first shut-off device determines that the second shut-off device is abnormal depending on the second state signal output from the second shut-off device, the first shut-off device may output an abnormal signal. In this case, the first shut-off device can notify the inverter, the user, or the like of an abnormality in the second shut-off device.

When the first shut-off device detects that the second state signal output from the second shut-off device is stopped, the first shut-off device may determine that the second shut-off device is abnormal. In this case, it is possible to detect the abnormality in the second shut-off device with a simple configuration.

The second shut-off device may be connected to the first shut-off device with a single wire. In this case, the second shut-off device can be connected to the first shut-off device in a two-way communicable manner with a simple and inexpensive configuration.

The second shut-off device may include an open-close unit. The open-close unit may be configured to open and close the connection between the solar cell module groups connected to the second electric path. The second state signal output from the second shut-off device may include information about an opened or closed state of the open-close unit. In this case, for example, the first shut-off device can monitor whether the open-close unit is operating normally.

The inverter may be configured to monitor the first shut-off device based on a first state signal output from the first shut-off device. In this case, the inverter can monitor whether the first shut-off device is operating normally.

When the inverter determines that the first shut-off device is abnormal depending on the first state signal, the inverter may output an abnormal signal. In this case, the inverter can notify the user or the like of an abnormality in the first shut-off device.

The first shut-off device may cut off the connection between the plurality of solar cell module groups connected to the first electric path in response to the first control signal from the inverter, and then output the second control signal to the second shut-off device. In this case, the voltage applied to the second shut-off device can be decreased. With the configuration, the cost of the second shut-off device can be reduced.

The plurality of solar cell module groups in the string may each have an open circuit voltage of 165 V or less. In this case, a safer solar power generation system can be provided.

The plurality of solar cell module groups in the string may include a first group. The first shut-off device may be driven by an electrical power generated by one or a plurality of solar cell modules connected in series belonging to the first group. In this case, when the first shut-off device is disposed in an existing solar power generation system, additional wiring for connecting the inverter and the first shut-off device can be omitted. Thus, the installation cost of the first shut-off device can be reduced. Further, the drive voltage range of the first shut-off device can be narrowed, reducing the manufacturing cost of the first shut-off device.

The plurality of solar cell module groups in the string may include a second group. The second shut-off device may be driven by an electrical power generated by one or a plurality of solar cell modules connected in series belonging to the second group. In this case, when the second shut-off device is disposed in an existing solar power generation system, additional wiring for connecting the inverter and the second shut-off device can be omitted. Thus, the installation cost of the second shut-off device can be reduced. Further, the drive voltage range of the second shut-off device can be narrowed, reducing the manufacturing cost of the second shut-off device.

The inverter may be configured to output the first control signal to the first shut-off device by power line communication. In this case, when the first shut-off device is disposed in an existing solar power generation system, additional wiring for ensuring the communication between the inverter and the first shut-off device can be omitted, which reduces the installation cost of the first shut-off device.

The inverter may be configured to output the first control signal to the first shut-off device by wireless communication. In this case, the first control signal can be output to the first shut-off device by remote control.

At least one of the plurality of solar cell module groups in the string may include a plurality of solar cell modules connected in series. In this case, the plurality of solar cell modules can be cut off by the first shut-off device or the second shut-off device.

The first shut-off device may include a first bypass diode connected in parallel with one of the plurality of solar cell module groups. In this case, it is possible to suppress heat generation and the like of the solar cell module that cannot generate power, and to suppress a decrease in the power generation efficiency of the string.

The second shut-off device includes a second bypass diode connected in parallel with one of the plurality of solar cell module groups. In this case, it is possible to suppress heat generation and the like of the solar cell module that cannot generate power, and to suppress a decrease in the power generation efficiency of the string.

BRIEF DESCRIPTION OF THE DRAWINGS

FIG. 5 is a diagram illustrating an example of the operation modes of a shut-off device.

DETAILED DESCRIPTION

Figure 1:
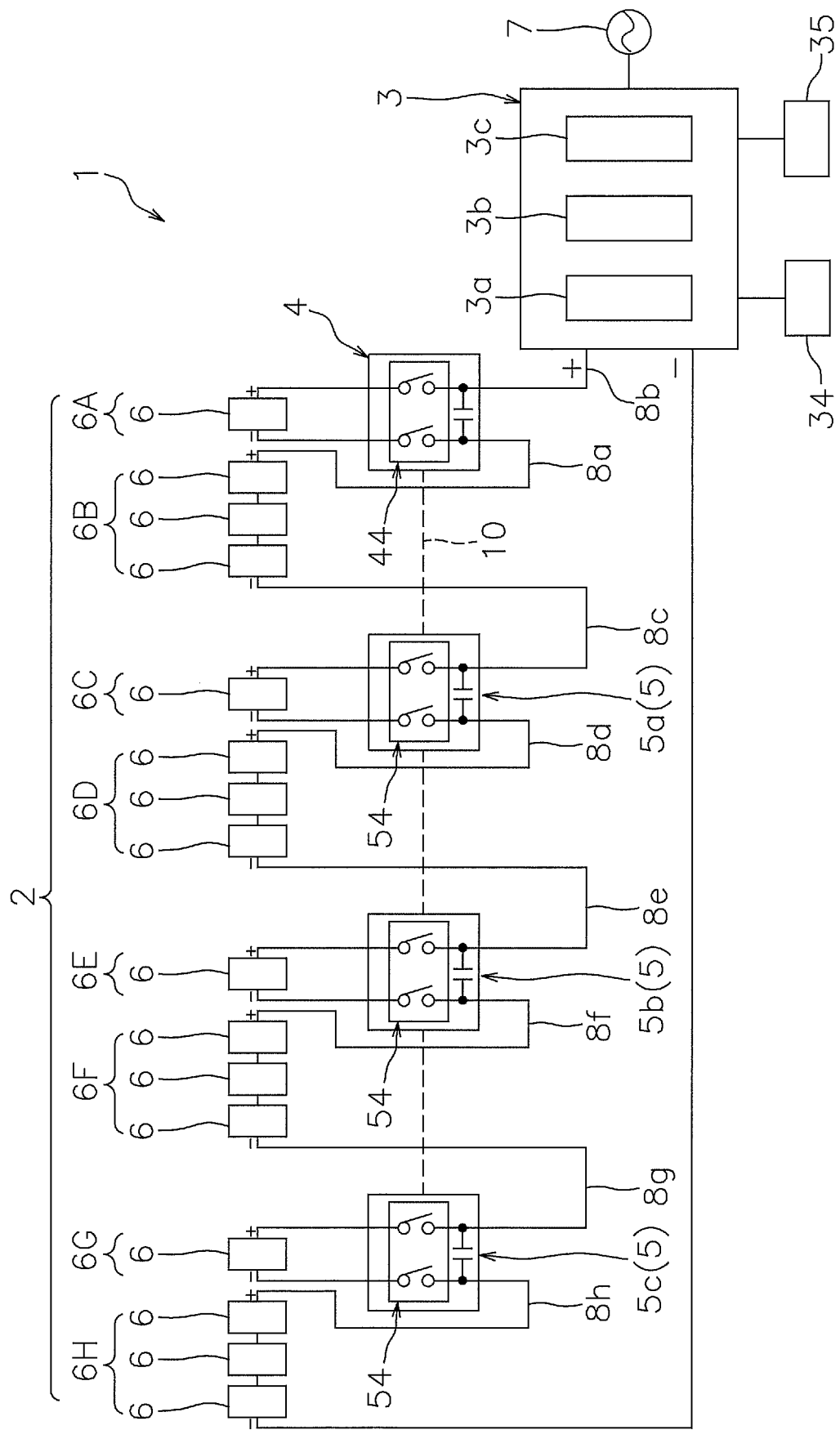
FIG. 1 is a block diagram schematically showing a configuration of a solar power generation system according to an aspect of the present invention.

FIG. 1 is a block diagram schematically showing a configuration of a solar power generation system 1 according to an aspect of the present invention. The solar power generation system 1 includes a string 2, an inverter 3, a first shut-off device 4, and a plurality of second shut-off devices 5.

The string 2 includes a plurality of solar cell module groups 6A to 6H connected in series with each other. The plurality of solar cell module groups 6A to 6H include one or a plurality of solar cell modules 6 connected in series. That is, the string 2 includes a plurality of (16 in the present embodiment) solar cell modules 6 connected in series with each other. Note that the solar power generation system 1 may include a solar cell array in which a plurality of strings 2 are connected in parallel.

The plurality of solar cell module groups 6A to 6H have an open circuit voltage, for each group, equal to or less than a predetermined open circuit voltage. The predetermined open circuit voltage is, for example, 165 V. That is, in the string 2, the plurality of solar cell module groups is divided into groups so that each group has an open circuit voltage of 165 V or less. The solar cell modules 6 have an open circuit voltage of 50 V, for example. Hereinafter, the solar cell module groups 6A to 6H may be referred to as groups 6A to 6H.

Each of the groups 6A, 6C, 6E, and 6G includes one solar cell modules 6. Each of the groups 6B, 6D, 6F, and 6H includes three solar cell modules 6 connected in series with each other. Thus, the open circuit voltage of the groups 6A, 6C, 6E, 6G is 50 V, and the open circuit voltage of the groups 6B, 6D, 6F, 6H is 150 V.

The groups 6A to 6H are arranged in alphabetical order from the group 6A to the group 6H and are connected in series with each other. The groups 6A to 6H each include an anode-side terminal and a cathode-side terminal. The anode-side terminal in each of the groups 6A to 6H corresponds to the anode-side terminal of the solar cell modules 6 closest to the anode of the inverter 3 among the plurality of solar cell modules 6 in the groups 6A to 6H. The cathode in each of the groups 6A to 6H corresponds to the cathode-side terminal of the solar cell modules 6 farthest from the anode of the inverter 3 among the plurality of solar cell modules 6 in the groups 6A to 6H.

For example, the anode-side terminal of the group 6A corresponds to the anode-side terminal of a solar cell module 6 in the group 6A. The anode-side terminal of the group 6A is connected to the anode-side terminal of the inverter 3. The cathode-side terminal of the group 6A corresponds to the cathode-side terminal of a solar cell module 6 in the group 6A. The cathode-side terminal of the group 6A is connected to the anode-side terminal of the group 6B.

For example, the anode-side terminal of the group 6B corresponds to the anode-side terminal of the solar cell module closest to the group 6A among the solar cell modules 6 in the group 6B. The cathode-side terminal of the group 6B corresponds to the cathode-side terminal of the solar cell module farthest from the group 6A among the solar cell modules 6 in the group 6B. The cathode-side terminal of the group 6B is connected to the anode-side terminal of the group 6C.

The cathode-side terminal of the group 6C is connected to the anode-side terminal of the group 6D. The cathode-side terminal of the group 6D is connected to the anode-side terminal of the group 6E. The cathode-side terminal of the group 6E is connected to the anode-side terminal of the group 6F. The cathode-side terminal of the group 6F is connected to the anode-side terminal of the group 6G. The cathode-side terminal of the group 6G is connected to the anode-side terminal of the group 6H. The cathode-side terminal of the group 6H is connected to the cathode-side terminal of the inverter 3.

The solar cell modules 6 receive sunlight to generate power, and output the generated electrical power to the inverter 3. The inverter 3 is connected to the string 2 via a power line. The inverter 3 converts the DC power from the solar cell modules 6 in the string 2 into AC power. The inverter 3 is connected to a power system 7 and supplies the AC power to the commercial power system or load devices.

Specifically, the inverter 3 includes a DC/DC converter 3a, a DC/AC inverter 3b, and a control unit 3c. The DC/DC converter 3a converts the voltage of the electrical power output from the solar cell modules 6 into a predetermined voltage and inputs it to the DC/AC inverter 3b. The DC/AC inverter 3b converts, via the DC/DC converter 3a, the DC power output from the solar cell modules 6 into AC power. The control unit 3c includes a CPU and memory, and controls the DC/DC converter 3a and the DC/AC inverter 3b. The control unit 3c outputs a first control signal to the first shut-off device 4 by power line communication.

The first shut-off device 4 is connected to electric paths connecting between the groups 6A to 6H. In the present embodiment, the first shut-off device 4 is connected to an electric path 8a connecting the group 6A and the group 6B and an electric path 8b connecting the inverter 3 and the group 6A. The first shut-off device 4 cuts off the connection between the group 6A and the group 6B and the connection between the inverter 3 and the group 6A in response to the first control signal from the inverter 3.

The first shut-off device 4 outputs a second control signal to the plurality of second shut-off devices 5 via a communication line 10 connected to the first shut-off device 4 and the plurality of second shut-off devices 5 by a communication system different from power line communication. The first shut-off device 4 outputs the second control signal to the second shut-off device 5a, using, for example, serial communication method such as Local Interconnect Network (LIN) communication or Serial Peripheral Interface (SPI) communication. The first shut-off device 4 cuts off the connection between the group 6A and the group 6B and the connection between the inverter 3 and the group 6A, and then outputs the second control signal to the plurality of second shut-off devices 5. The first shut-off device 4 is connected to each of the plurality of second shut-off devices 5 via the communication line 10.

The first shut-off device 4 and the plurality of second shut-off devices 5 are in a master-slave relationship. The first shut-off device 4 functions as a master for the second shut-off devices 5, and the plurality of second shut-off devices 5 functions as a slave for the first shut-off device 4. That is, the first shut-off device 4 controls the plurality of second shut-off devices 5.

Figure 2:
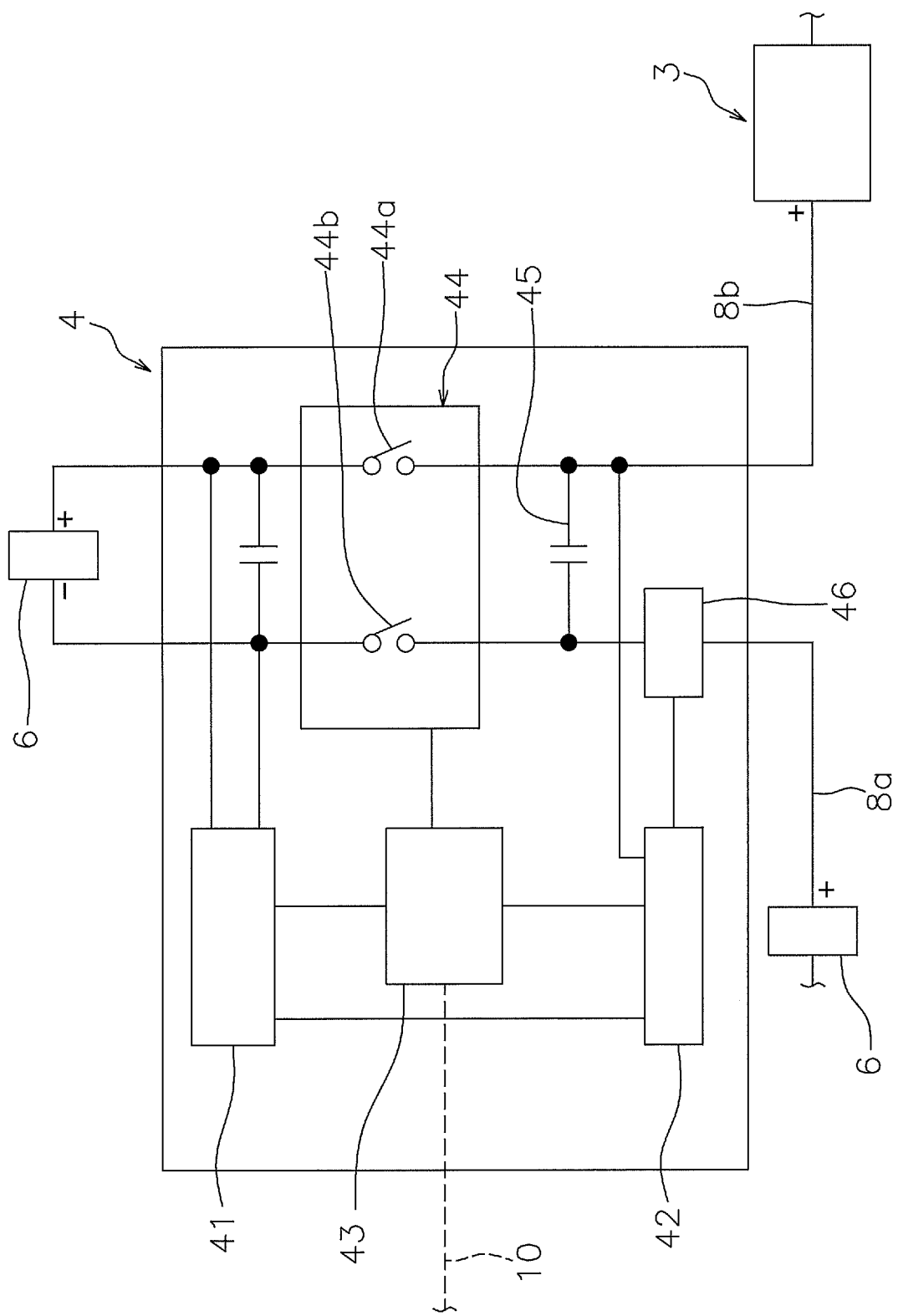
FIG. 2 is a block diagram schematically showing a configuration of a first shut-off device.

FIG. 2 is a block diagram schematically showing a configuration of the first shut-off device 4. The first shut-off device 4 includes a regulator 41, a signal receiving unit 42, a control unit 43, a relay 44, and a bypass circuit 45.

The regulator 41 uses the electrical power generated by the solar cell module 6 as a power source to generate a drive power for driving the first shut-off device 4 and supplies the drive power in a stable state to the first shut-off device 4. Here, only the power generated by the solar cell module 6 of the group 6A is used to generate the drive power to drive the first shut-off device 4.

Figure 3:
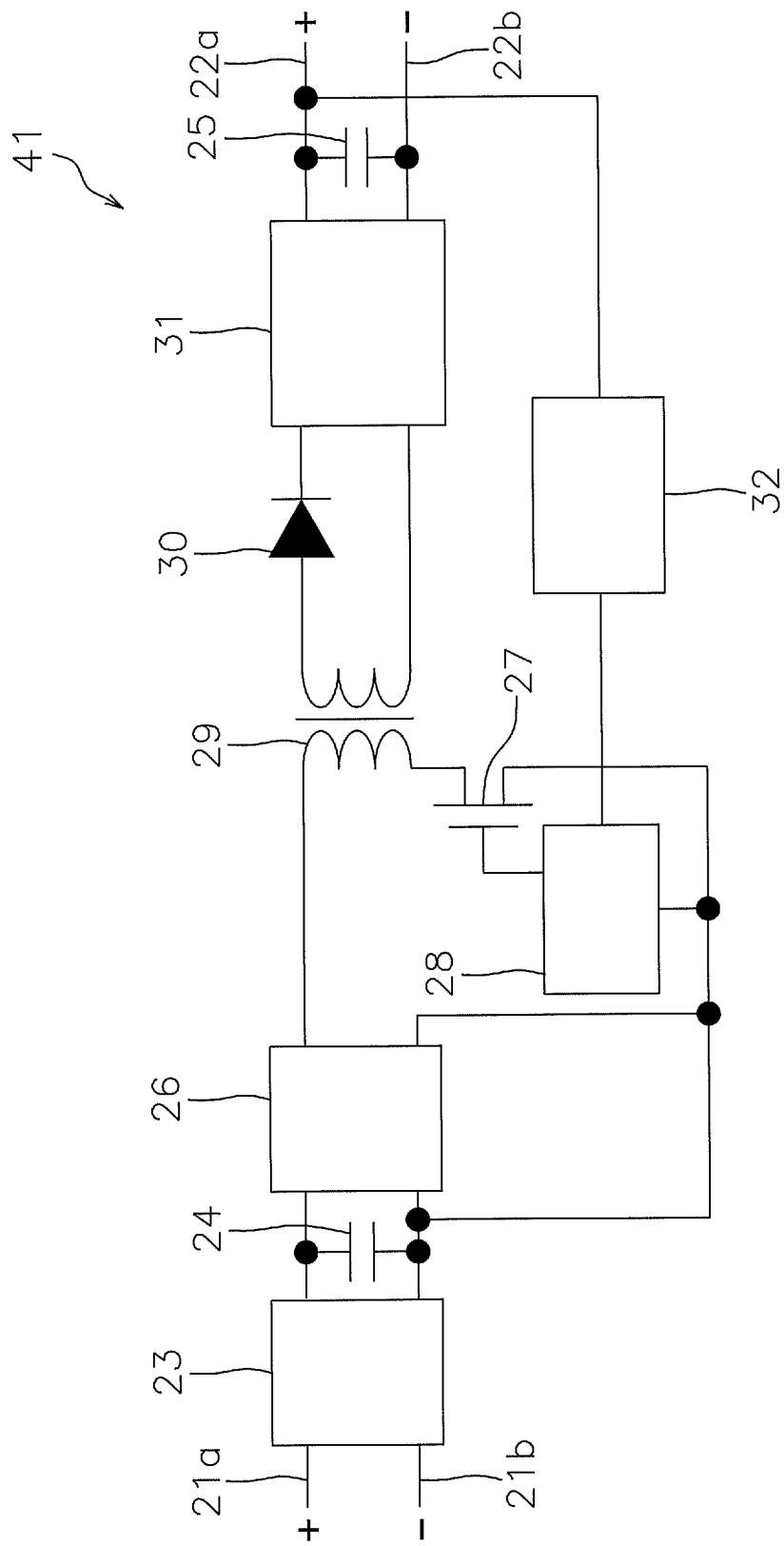
FIG. 3 is a circuit diagram schematically showing a configuration of a regulator.

FIG. 3 is a circuit diagram schematically showing a configuration of the regulator 41. The configuration of the regulator 41 is a well-known configuration, and includes input terminals 21a and 21b, output terminals 22a and 22b, a line filter 23, capacitors 24 and 25, a booster circuit 26, a switching element 27, a control circuit 28, a transformer 29, a diode 30, a DC/DC converter 31, a feedback circuit 32 and the like.

The signal receiving unit 42 receives the first control signal from the control unit 3c of the inverter 3 and outputs the received first control signal to the control unit 43. Specifically, the signal receiving unit 42 receives the first control signal from the control unit 3c of the inverter 3 via a signal detection unit 46 that detects a first control signal from the control unit 3c of the inverter 3.

The control unit 43 includes a CPU and memory. The control unit 43 controls the electric current flowing through the coil in the relay 44 based on the signals output from the signal receiving unit 42, and controls the opening and closing of the contacts of the relay 44. The relay 44 is, for example, a mechanical relay, and is able to open and close a high-voltage direct current.

The control unit 43 outputs the second control signal to the plurality of second shut-off devices 5 via the communication line 10 by a communication system different from power line communication. The control unit 43 cuts off the connection between the group 6A and the group 6B, and then outputs the second control signal to the plurality of second shut-off devices 5. The control unit 43 determines whether or not the connection between the group 6A and the group 6B is cut off by monitoring the voltage between the contacts of the relay 44, for example.

The relay 44 includes a first open-close unit 44a and a second open-close unit 44b. The first open-close unit 44a is disposed in the electric path 8b. The first open-close unit 44a opens and closes the connection between the inverter 3 and the group 6A. The first open-close unit 44a is connected to the anode-side terminal of the group 6A and the anode-side terminal of the inverter 3. The second open-close unit 44b is disposed in the electric path 8a. The second open-close unit 44b opens and closes the connection between the group 6A and the group 6B. The second open-close unit 44b is connected to the cathode-side terminal of the group 6A and the anode-side terminal of the group 6B. In the present embodiment, the first open-close unit 44a may be omitted.

While the first shut-off device 4 is not supplied with the drive power from the regulator 41, the first open-close unit 44a and the second open-close unit 44b are in an open state all the time. Accordingly, while the first shut-off device 4 is not driven, the connection between the inverter 3 and the group 6A and the connection between the group 6A and the group 6B are in a cutoff state.

The bypass circuit 45 is a circuit to allow the signal receiving unit 42 to receive the first control signal from the control unit 3c when the first shut-off device 4 is in the cutoff state. While the electric paths 8a and 8b are in the cutoff state by the first shut-off device 4, the signal receiving unit 42 is able to receive the first control signal from the control unit 3c via the bypass circuit 45.

The plurality of second shut-off devices 5 are connected to electric paths 8c to 8h connecting between the groups 6C to 6H other than the groups 6A and 6B connected to the electric path 8a. The plurality of second shut-off devices 5 are connected to the first shut-off device 4 in a two-way communicable manner via the communication line 10, for example by the serial communication method. The plurality of second shut-off devices 5 are connected to the first shut-off device 4 with a single wire. That is, the plurality of second shut-off devices 5 are connected to the first shut-off device 4 via one communication line 10. The plurality of second shut-off devices 5 cut off the connections between the groups 6C to 6H in response to the second control signal output from the first shut-off device 4 via the communication line 10. In the present embodiment, the plurality of second shut-off devices 5 include three second shut-off devices 5a to 5c.

The second shut-off device 5a is connected to the electric path 8c connecting the group 6B and the group 6C, and the electric path 8d connecting the group 6C and the group 6D. The second shut-off device 5b is connected to the electric path 8e connecting the group 6D and the group 6E, and the electric path 8f connecting the group 6E and the group 6F. The second shut-off device 5c is connected to the electric path 8g connecting the group 6F and the group 6G, and the electric path 8h connecting the group 6G and the group 6H.

Figure 4:
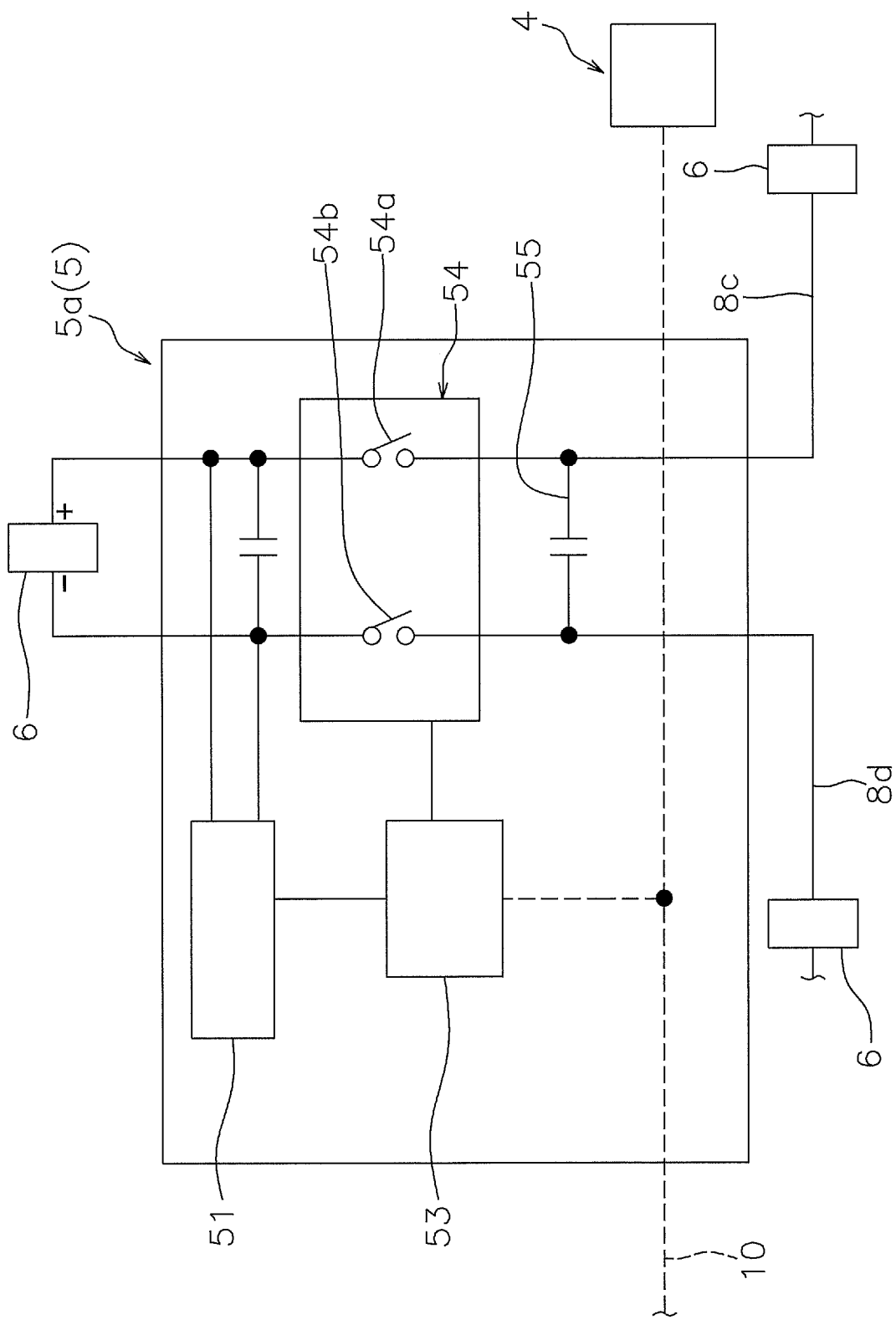
FIG. 4 is a block diagram schematically showing a configuration of a second shut-off device.

FIG. 4 is a block diagram schematically showing a configuration of the second shut-off device 5a. The second shut-off device 5a includes a regulator 51, a control unit 53, a relay 54, and a bypass circuit 55.

The regulator 51 uses the electrical power generated by the solar cell module 6 as a power source to generate a drive power for driving the second shut-off device 5a and supplies the drive power in a stable state to the second shut-off device 5a. Here, only the power generated by the solar cell modules 6 of the group 6B is used to generate the drive power to drive the second shut-off device 5a. Note that the configuration of the regulator 51 is similar to that of the regulator 41 of the first shut-off device 4, and thereby detailed description thereof is omitted.

The control unit 53 includes a CPU and memory. The control unit 53 controls the electric current flowing through the coil of the relay 54 in response to the second control signal from the first shut-off device 4, and controls the opening and closing of the contacts of the relay 54. The relay 54 is, for example, a mechanical relay and is able to open and close a high-voltage direct current. The relay 54 is an example of an open-close unit. The control unit 53 receives the second control signal from the first shut-off device 4 via a communication interface (not shown) connected to the communication line 10, and opens the contacts of the relay 54. Specifically, when the control unit 53 receives the second control signal from the first shut-off device 4, the control unit 53 outputs a command signal to open the contacts of the relay 54 to a relay control unit (not shown). The relay control unit receives the command signal from the control unit 53 and opens the contacts of the relay 54. The control unit 53 feeds the output of the command signal to open the contacts of the relay 54 back to the first shut-off device 4 via the communication line 10.

The relay 54 includes a third open-close unit 54a and a fourth open-close unit 54b. The third open-close unit 54a is disposed in the electric path 8c. The third open-close unit 54a opens and closes the connection between the group 6B and the group 6C.

The third open-close unit 54a is connected to the cathode-side terminal of the group 6B and the anode-side terminal of the group 6C. The fourth open-close unit 54b is disposed in the electric path 8d. The fourth open-close unit 54b opens and closes the connection between the group 6C and the group 6D. The fourth open-close unit 54b is connected to the cathode-side terminal of the group 6C and the anode-side terminal of the group 6D.

While the second shut-off device 5a is not supplied with the drive power from the regulator 51, the third open-close unit 54a and the fourth open-close unit 54b are in the open state all the time. Accordingly, while the second shut-off device 5a is not driven, the connection between the group 6B and the group 6C and the connection between the group 6C and the group 6D are in the cutoff state.

The bypass circuit 55 is a circuit to allow the signal receiving unit 42 of the first shut-off device 4 to receive the first control signal from the control unit 3c by power line communication when the second shut-off devices 5 are in the cutoff state. The bypass circuit 55 enables continuation of the power line communication.

The relay 54 of the second shut-off device 5b opens and closes the connection between the group 6D and the group 6E, and the connection between the group 6E and the 6F. The relay 54 of the second shut-off device 5c opens and closes the connection between the group 6F and the group 6G, and the connection between the group 6G and the group 6H. The second shut-off device 5b and the second shut-off device 5c have similar configurations to those of the second shut-off device 5a except that the electric path to be connected is different from the second shut-off device 5a, and thereby detailed description thereof will be omitted.

The first shut-off device 4 monitors the second shut-off devices 5a to 5c based on state signals output from the second shut-off devices 5a to 5c. The first shut-off device 4 outputs an abnormal signal to the inverter 3 when determining that the second shut-off devices 5a to 5c are abnormal depending on the state signals output from the second shut-off devices 5a to 5c. When the inverter 3 receives the abnormal signal, the inverter 3 notifies that the second shut-off devices 5a to 5c are abnormal via a display unit 34 connected to the inverter 3.

The state signals output from the second shut-off devices 5a to 5c are, for example, feedback to the first shut-off device 4 in response to the control unit 53 outputting the command signal to the relay control unit in response to the second control signal. The first shut-off device 4 determines that the second shut-off devices 5a to 5c are abnormal when there are no feedback from the second shut-off devices 5a to 5c.

Next, an example of the operation modes of the first shut-off device 4 and the plurality of second shut-off devices 5 will be described with reference to FIG. 5. The operation modes of the first shut-off device 4 and the plurality of second shut-off devices 5 include three of a start mode, an active mode, and a safety mode. The safety mode includes a normal shut-off mode and an emergency safety shut-off mode. Thus, the first shut-off device 4 and the plurality of second shut-off devices 5 operate in four operation modes:

a start mode, an active mode, a normal shut-off mode, and an emergency safety shut-off mode.

The start mode is a mode for when sunlight starts to hit the solar cell modules 6. At this time, the solar cell modules 6 receive sunlight and generate power. Then, the first shut-off device 4 is driven by the drive power generated by the regulator 41 using the power generated by the solar cell module 6 of the first group 6A and the first shut-off device 4 is driven by the drive power generated by the regulator 41 using the power generated by the solar cell module 6 of the first group 6A. When the first shut-off device 4 is driven and the control unit 43 receives the first control signal from the control unit 3c of the inverter 3 via the signal receiving unit 42, the control unit 43 controls to close the first open-close unit 44a and the second open-close unit 44b of the relay 44.

Similarly, the second shut-off device 5a is driven by the drive power generated by the regulator 51 of the second shut-off device 5a using the power generated by the solar cell module 6 of the group 6C. When the second shut-off device 5a is driven and the control unit 53 receives a command signal from the first shut-off device 4, which is different from the second control signal, for example, the control unit 53 controls to close the third open-close unit 54a and the fourth open-close unit 54b of the relay 54. The second shut-off device 5b and the second shut-off device 5c operate in the same manner as the second shut-off device 5a. Consequently, the groups 6A to 6H are connected to the string 2 via the first shut-off device 4 and the second shut-off devices 5a to 5c, and the power generated by the solar cell modules 6 is output to the inverter 3.

The active mode is a state in which the solar cell modules 6 receive sunlight during the daytime to generate power, and is substantially the same as the start mode. Thus, in the active mode, the groups 6A to 6H are in connection with each other via the first shut-off device 4 and the second shut-off devices 5a to 5c, and the power generated by the solar cell modules 6 is output to the inverter 3.

The normal shut-off mode is a mode for when the solar cell modules 6 are not exposed to sunlight at night or due to the influence of bad weather such as rain. Accordingly, in the normal shut-off mode, the solar cell modules 6 do not generate power, and the second shut-off devices 5a to 5c are not supplied with the drive power from the solar cell modules 6. Thus, in the normal shut-off mode, the first open-close unit 44a and the second open-close unit 44b of the first shut-off device 4 and the third open-close unit 54a and the fourth open-close unit 54b of the second shut-off devices 5a to 5c are all in the open state. In the present embodiment, electrical power is supplied to the inverter 3 from the AC power supply, and the control signal is always output from the control unit 3c of the inverter 3 except in the emergency safety shut-off mode.

In the normal shut-off mode, for example, when the power generation by the solar cell module 6 of the group 6A is unstable due to the unstable weather or the like, the relay 44 is turned into the ON/OFF state depending on the power supplied from the solar cell module 6 of the group 6A. Also, when the power generation by the solar cell module 6 of the group 6C is unstable, the relay 54 is turned into the ON/OFF state depending on the power supplied from the solar cell module 6 of the group 6C.

The emergency safety shut-off mode is a mode in which the electric paths 8a to 8h are cut off so that the power supply from the solar cell modules 6 to the inverter 3 is stopped during the start mode or the active mode. In the present embodiment, as shown in FIG. 1, an operation switch 35 is connected to the inverter 3 and the operation switch 35 is operated during the start mode or the active mode of the first shut-off device 4, the operation mode of the first shut-off device 4 is switched to the emergency safety shut-off mode.

Specifically, when the operation switch 35 is operated, the control unit 3c stops the output of the first control signal. When the signal detection unit 46 detects the stop of the first control signal of a fixed cycle, the first open-close unit 44a and the second open-close unit 44b of the relay 44 are turned open via the signal receiving unit 42 and the control unit 43. As a result, the connection between the group 6A and the group 6B and the connection between the inverter 3 and the group 6A are cut off, and the output of power from the solar cell modules 6 to the inverter 3 is stopped. At this point of time, the first shut-off device 4 opens the first open-close unit 44a and the second open-close unit 44b of the relay 44, and then outputs the second control signal to the second shut-off devices 5a to 5c via the communication line 10. The second shut-off devices 5a to 5c receive the second control signal from the first shut-off device 4 and then cut off the connections between the groups 6C to 6H. As a result, all the groups 6A to 6H are separated from each other, so that the open circuit voltage of the string 2 is divided into 165V or less. Each of the control units 53 of the second shut-off devices 5a to 5c feeds the output of the command signal to the relay control unit to open the contacts of the relay 54 in response to the second control signal from the first shut-off device 4 back to the first shut-off device 4. The first shut-off device 4 determines that the second shut-off devices 5a to 5c are abnormal and outputs the abnormal signal to the inverter 3 when there are no feedback from the second shut-off devices 5a to 5c.

In the solar power generation system 1 of the above configuration, the first shut-off device 4 and the second shut-off devices 5a to 5c are in a master-slave relationship, and the second shut-off devices 5a to 5c cut off the connections between the plurality of solar cell module groups 6B to 6H in response to the second control signal output from the first shut-off device 4. Thus, in the second shut-off devices 5a to 5c, the functions of the signal receiving unit 42 and the signal detection unit 46 can be omitted. As a result, the second shut-off devices 5a to 5c can have a simplified configuration, reducing the installation cost of the plurality of second shut-off devices 5.

Since the plurality of solar cell module groups 6A to 6H each have an open circuit voltage of 165 V or less, a highly safe solar power generation system can be provided. Further, the second control signal from the first shut-off device 4 is output via the communication line 10 by a communication system different from power line communication, and thereby the signal is unlikely to be affected by noise as compared with the power line communication, and the communication from the first shut-off device 4 to the plurality of second shut-off devices 5 can be stabilized.

Further, in the solar power generation system 1 of the above configuration, after the connection between the group 6A and the group 6B is cut off by the first shut-off device 4, the connections between the plurality of solar cell module groups 6B to 6H are cut off by the second shut-off devices 5a to 5c. Thus, the voltage applied to the second shut-off devices 5a to 5c can be decreased, reducing the cost of the second shut-off devices 5a to 5c.

The first shut-off device 4 is connected to the second shut-off device 5a to 5c in a two-way communicable manner and monitors the second shut-off devices 5a to 5c based on state signals output from the second shut-off devices 5a to 5c. As a result, when the operation switch 35 is operated, the first shut-off device 4 can detect that the second shut-off devices 5a to 5c are operating normally, so a further highly safe solar power generation system can be provided.

One embodiment of the present invention has been described above, but the present invention is not limited to the above embodiment, and various modifications are possible as long as the modifications are within a scope of the disclosure.

Figure 6:
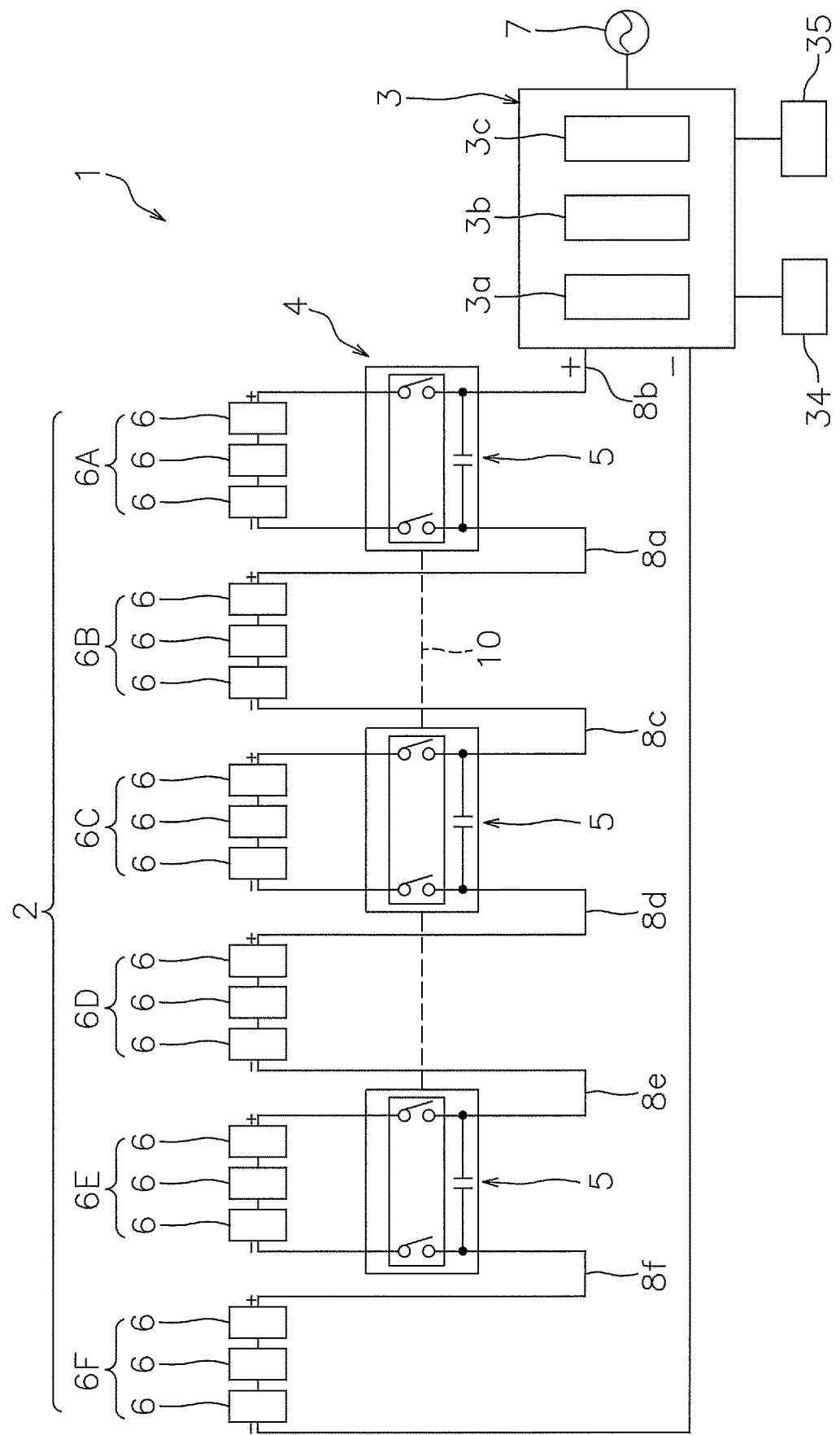
FIG. 6 is a block diagram schematically showing a configuration of a solar power generation system according to another embodiment.

The number of groups of the plurality of solar cell module groups is not limited to the above embodiment. The string 2 may be divided into a plurality of solar cell module groups as long as each group has an open circuit voltage of 165 V or less. For example, as shown in FIG. 6, each of the plurality of solar cell module groups 6A to 6F may include three solar cell modules 6 connected in series. That is, the plurality of solar cell module groups may be divided by the first shut-off device 4 and the plurality of second shut-off devices 5 so that a plurality of solar cell module groups each include three solar cell modules 6 connected in series.

Figure 7:
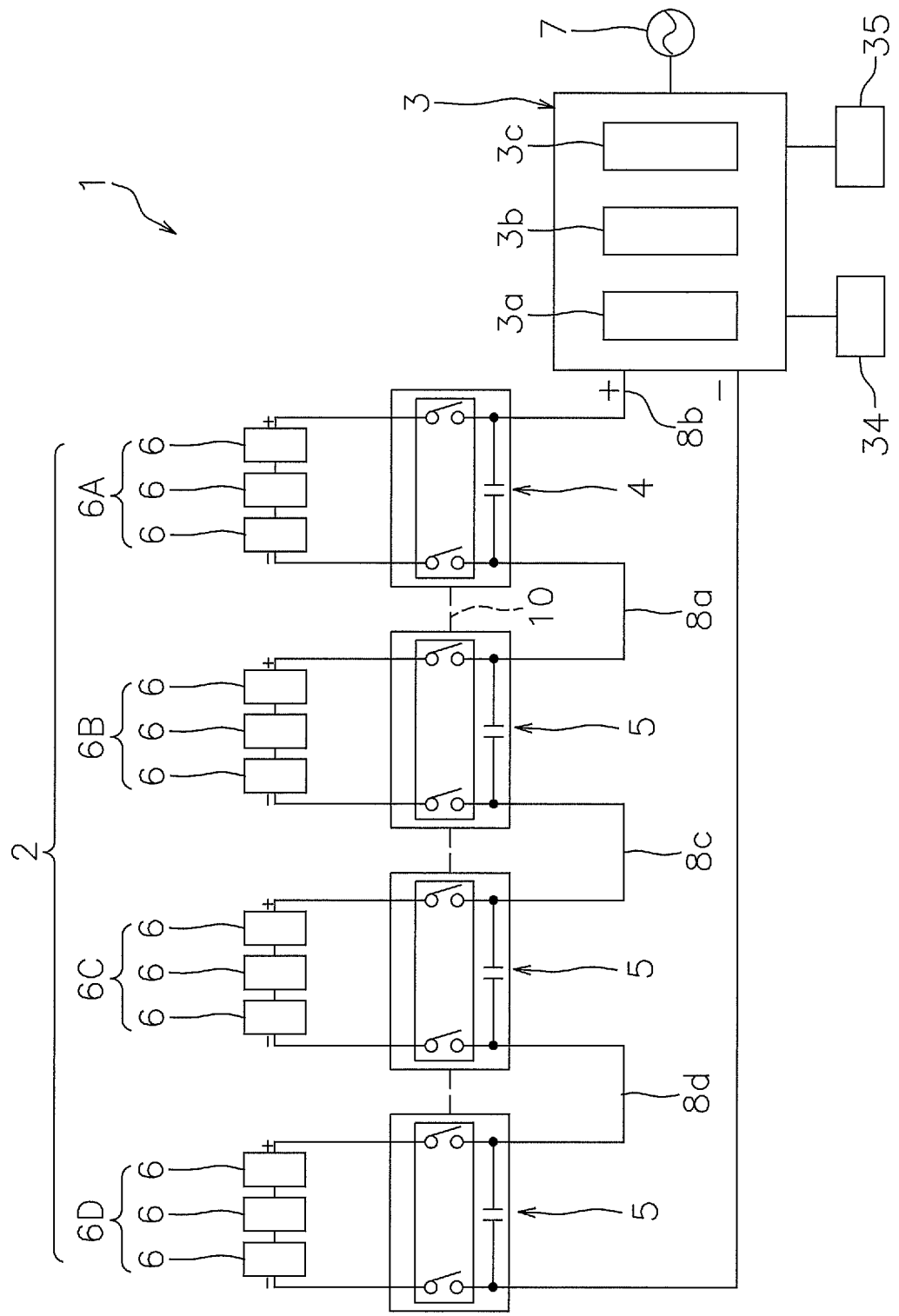
FIG. 7 is a block diagram schematically showing a configuration of a solar power generation system according to another embodiment.

Further, as shown in FIG. 7, the plurality of second shut-off devices 5 each may be disposed in each of the plurality of solar cell module groups except the group (the group 6A here) to which the first shut-off device 4 is connected.

Figure 8:
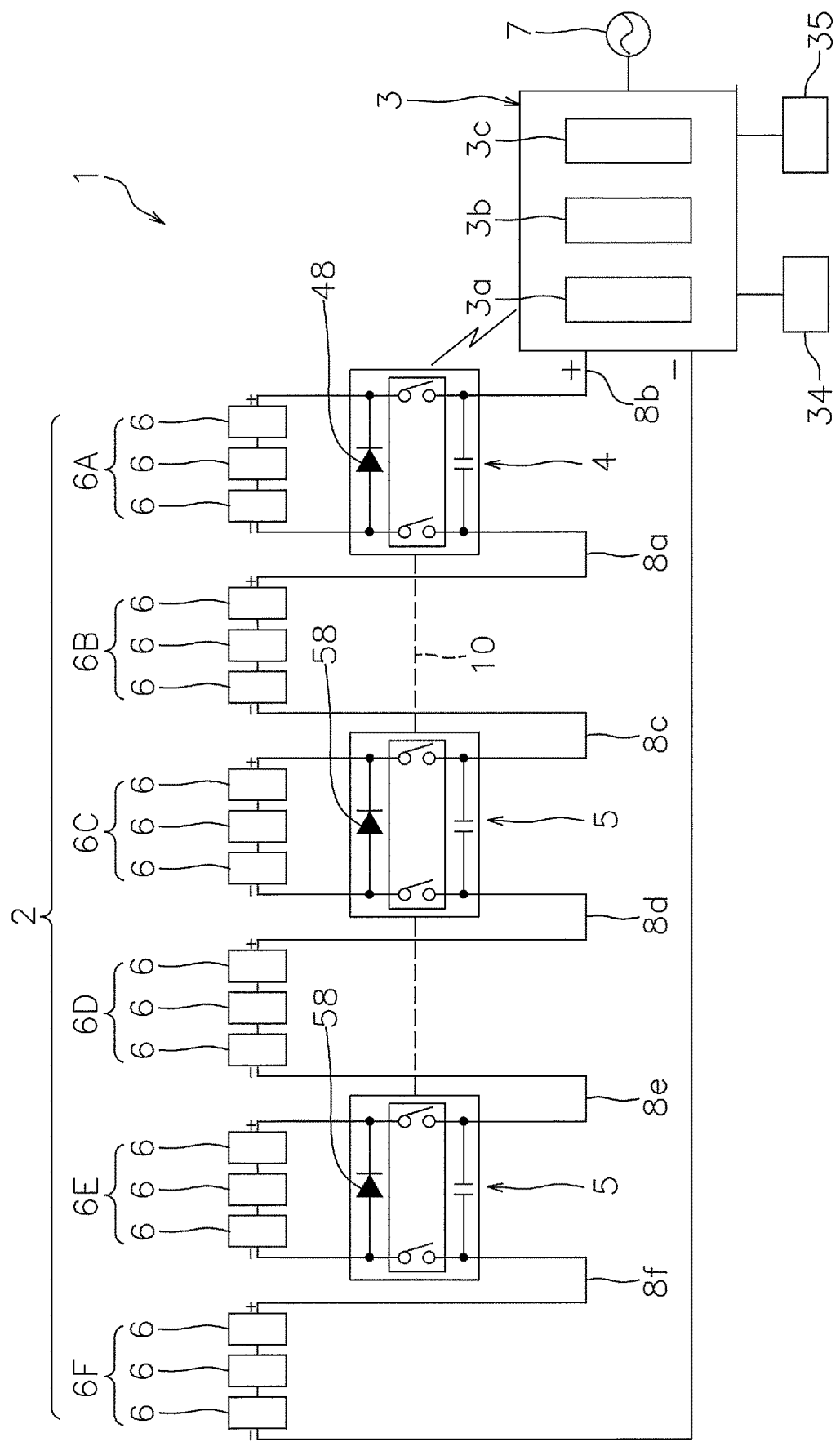
FIG. 8 is a block diagram schematically showing a configuration of a solar power generation system according to another embodiment.

As shown in FIG. 8, the first shut-off device 4 may include bypass diodes 48 connected in parallel with any of the plurality of solar cell module groups. In the example shown in FIG. 8, bypass diodes 48 are electrically connected in parallel with group 6A. The bypass diode 48 includes an anode connected to the cathode-side terminal of group 6A and a cathode connected to the anode-side terminal of group 6A. Similarly, the plurality of second shut-off devices 5 may include bypass diodes 58 connected in parallel with any of the plurality of solar cell module groups. In the example shown in FIG. 8, the bypass diodes 58 are electrically connected in parallel with each of the groups 6C and 6E.

Figure 9:
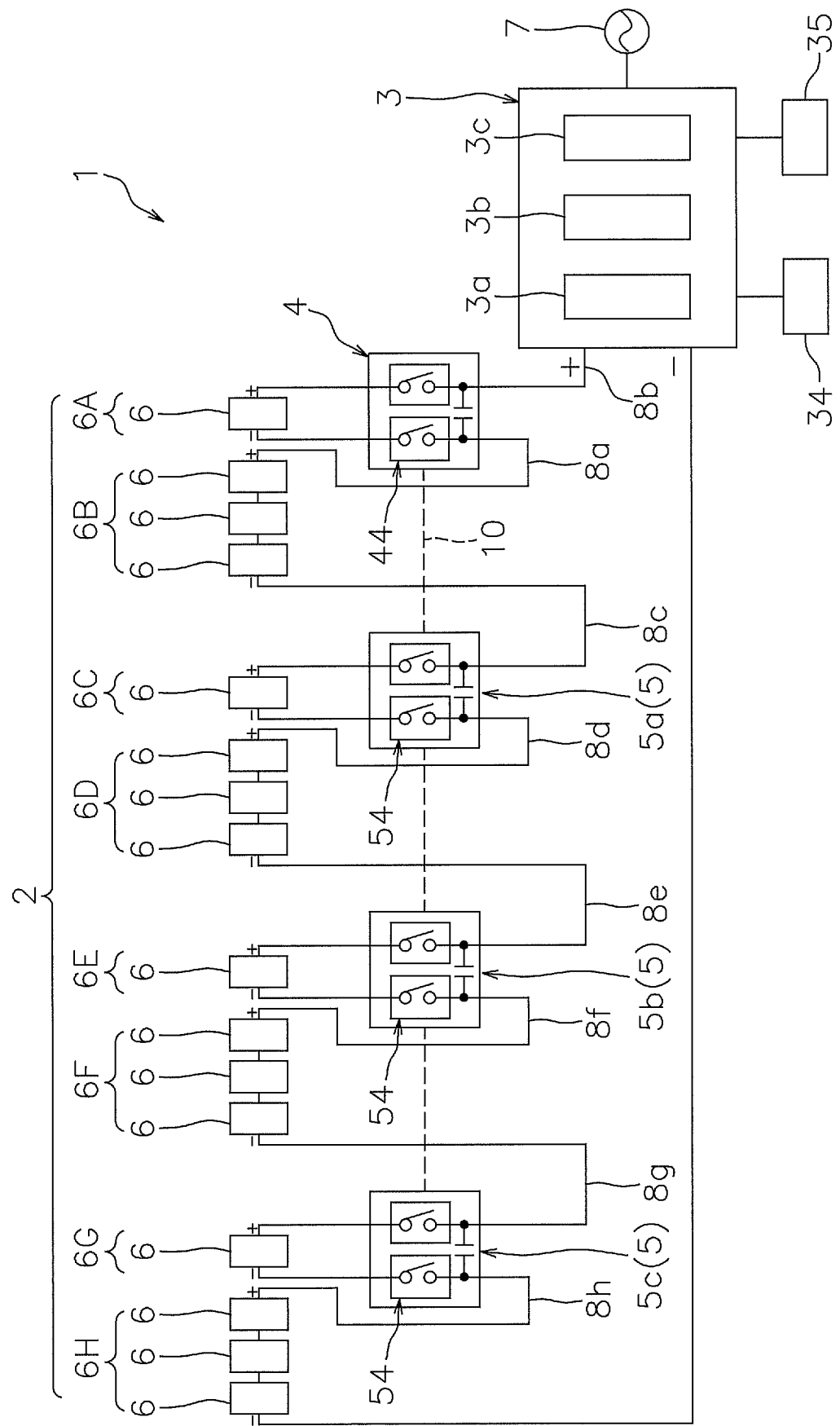
FIG. 9 is a block diagram schematically showing a configuration of a solar power generation system according to another embodiment.

In the above embodiment, the relay 44 of the first shut-off device 4 has two contacts of the first open-close unit 44a and the second open-close unit 44b, but as shown in FIG. 9, the relay 44 may be two relays having a single contact. That is, the control unit 43 of the first shut-off device 4 may be configured to independently control the opening and closing of the first open-close unit 44a and the second open-close unit 44b. Similarly, in the plurality of second shut-off devices 5 also, the control unit 53 may be configured to be able to independently control the third open-close unit 54a and the fourth open-close unit 54b of the relay 54.

In the above embodiment, the first shut-off device 4 is connected to the electric path 8a connecting the group 6A and the group 6B and the electric path 8b connecting the inverter 3 and the group 6A. However, the arrangement of the first shut-off device 4 may be exchanged with that of the plurality of second shut-off devices 5. For example, the first shut-off device 4 may be connected to the electric path 8c and the electric path 8d, and the second shut-off device 5a may be connected to the electric path 8a and the electric path 8b.

In the above embodiment, the first control signal is output to the first shut-off device 4 by power line communication, but as shown in FIG. 8, the first signal may be output to the first shut-off device 4 by wireless communication such as Wi-Fi®. Alternatively, the inverter 3 and the first shut-off device 4 may be configured to be in communication with each other by wireless communication. For example, the first shut-off device 4 may output the abnormal signal to the inverter 3 by wireless communication. Alternatively, the first shut-off device 4 may be configured to output the abnormal signal to a user's mobile terminal by wireless communication.

In the above embodiment, the first shut-off device 4 determines that the second shut-off devices 5a to 5c are abnormal when there are no feedback from the second shut-off devices 5a to 5c. However, the determination of whether or not the second shut-off devices 5a-5c are abnormal by the first shut-off device 4 is not limited to the above embodiment. For example, the first shut-off device 4 may be configured to periodically communicate with the second shut-off devices 5a-5c, and when there is no communication response from the second shut-off devices 5a-5c (when the periodic communication is interrupted), the first shut-off device 4 may determine that the second shut-off devices 5a-5c are abnormal.

The state signals output from the second shut-off devices 5a to 5c are not limited to the above embodiment. The state signals output from the second shut-off devices 5a to 5c may include at least one of information about the voltage of the second shut-off devices 5a to 5c, current of the second shut-off devices 5a to 5c, or an opened or closed state of the relay 54. The first shut-off device 4 may determine that the second shut-off devices 5a to 5c are abnormal based on the information about the opened or closed state of the relay 54, or may determine that the second shut-off devices 5a to 5c are abnormal by monitoring the voltage between the contacts of relay 54 based on the state signals output from the second shut-off devices 5a to 5c to detect welding of relay 54. The state signals output from the second shut-off devices 5a to 5c may include information indicating that the second shut-off devices 5a to 5c are abnormal. That is, the second shut-off devices 5a to 5c may be configured to monitor their own voltage and the like and detect abnormalities in the second shut-off devices 5a to 5c themselves.

The second shut-off devices 5a-5c may be connected to the first shut-off device 4 via two communication lines. That is, the second shut-off devices 5a to 5c may be configured to be able to communicate with the first shut-off device 4 at all times.

The first shut-off device 4 may output the state signal to the inverter 3 via power line communication or wireless communication. The inverter 3 may monitor the first shut-off device 4 based on the state signal output from the first shut-off device 4. When the inverter 3 determines that the first shut-off device 4 is abnormal depending on the state signal output from the first shut-off device 4, the inverter 3 may output an abnormal signal to the display unit 34 or the user's mobile terminal to report that the first shut-off device 4 is abnormal. The state signal output from the first shut-off device 4 may be the same information as the state signals output from the second shut-off devices 5a to 5c. The state signal output from the first shut-off device 4 may be, for example, feedback to the inverter in response to the first shut-off device 4 outputting the command signal to the relay 44 in response to the first control signal, may include at least one of information about the voltage of the first shut-off device 4, current of the first shut-off device 4, or an opened or closed state of the relay 44, or may include information indicating that the first shut-off device 4 is abnormal.

REFERENCE NUMERALS

1 Solar power generation system
2 String
3 Inverter
4 First shut-off device 5a to 5c Second shut-off devices
6 Solar cell module
6A to 6H Solar cell module groups
54 Relay (An example of open-close unit)

The invention claimed is:

1. A solar power generation system, comprising:
a string including a plurality of solar cell module groups connected in series with each other, the solar cell module groups each including one or a plurality of solar cell modules connected in series;
an inverter connected to the string and configured to convert DC power output from the string to AC power;
a first shut-off device connected to a first electric path connecting between the plurality of solar cell module groups; and
a second shut-off device connected to a second electric path connecting between the plurality of solar cell module groups different from the plurality of solar cell module groups connected to the first electric path, wherein
the plurality of solar cell module groups in the string each have an open circuit voltage equal to or less than a predetermined open circuit voltage,
the first shut-off device cuts off a connection between the plurality of solar cell module groups connected to the first electric path in response to a first control signal from the inverter, and
the second shut-off device is connected to the first shut-off device in a two-way communicable manner by a communication system different from power line communication, the second shut-off device configured to cut off a connection between the plurality of solar cell module groups connected to the second electric path in response to a second, direct control signal output from the first shut-off device and transmitted to the second shut-off device via the communication system different from power line communication.

2. The solar power generation system according to claim 1, wherein the first shut-off device is configured to monitor the second shut-off device based on a second state signal output from the second shut-off device.

3. The solar power generation system according to claim 2, wherein when the first shut-off device determines that the second shut-off device is abnormal depending on the second state signal, the first shut-off device outputs an abnormal signal.

4. The solar power generation system according to claim 3, wherein when the first shut-off device detects that output of the second state signal is stopped, the first shut-off device determines that the second shut-off device is abnormal.

5. The solar power generation system according to claim 1, wherein the second shut-off device is connected to the first shut-off device with a single wire.

6. The solar power generation system according to claim 2, wherein the second shut-off device includes an open-close unit, the open-close unit configured to open and close the connection between the plurality of solar cell module groups connected to the second electric path, and
the second state signal includes information about an opened or closed state of the open-close unit.

7. The solar power generation system according to claim 1, wherein the inverter is configured to monitor the first shut-off device based on a first state signal output from the first shut-off device.

8. The solar power generation system according to claim 7, wherein when the inverter determines that the first shut-off device is abnormal depending on the first state signal, the inverter outputs an abnormal signal.

9. The solar power generation system according to claim 1, wherein the first shut-off device cuts off the connection between the plurality of solar cell module groups connected to the first electric path in response to the first control signal from the inverter, and then outputs the second, direct control signal to the second shut-off device.

10. The solar power generation system according to claim 1, wherein the open circuit voltage of each of the plurality of solar cell module groups in the string is 165 V or less.

11. The solar power generation system according to claim 1, wherein the plurality of solar cell module groups in the string includes a first group, and
the first shut-off device is driven by an electrical power generated by one or a plurality of solar cell modules connected in series belonging to the first group.

12. The solar power generation system according to claim 1, wherein the plurality of solar cell module groups in the string includes a second group, and
the second shut-off device is driven by an electrical power generated by one or a plurality of solar cell modules connected in series belonging to the second group.

13. The solar power generation system according to claim 1, wherein the inverter is configured to output the first control signal to the first shut-off device by power line communication.

14. The solar power generation system according to claim 1, wherein the inverter is configured to output the first control signal to the first shut-off device by wireless communication.

15. The solar power generation system according to claim 1, wherein at least one of the plurality of solar cell module groups in the string includes a plurality of solar cell modules connected in series.

16. The solar power generation system according to claim 1, wherein the first shut-off device includes a first bypass diode connected in parallel with one of the plurality of solar cell module groups.

17. The solar power generation system according to claim 1, wherein the second shut-off device includes a second bypass diode connected in parallel with one of the plurality of solar cell module groups.

* * * * *